Dec. 22, 1970   J. D. HEIGHTLEY ET AL   3,550,098
INTERLACED CURRENT PULSE CONFIGURATION CONTROL
Filed Nov. 1, 1967   3 Sheets-Sheet 1
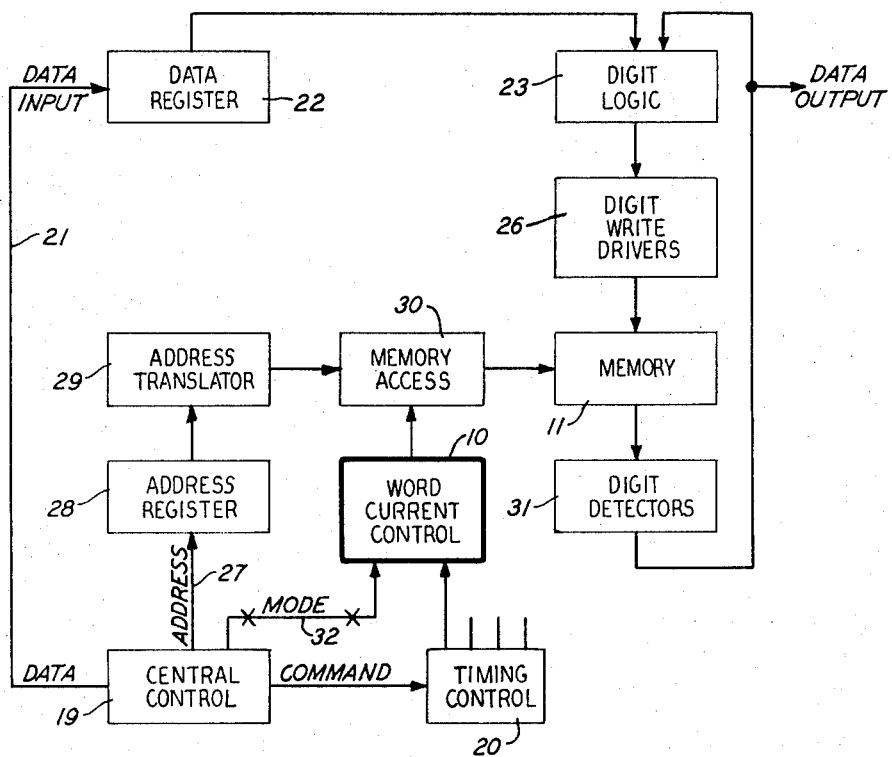
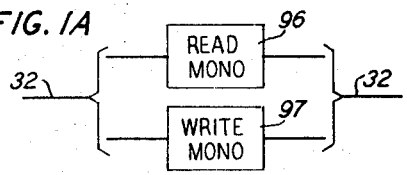
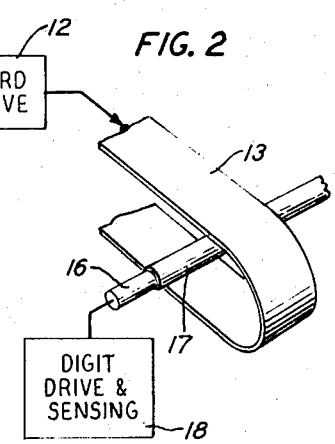
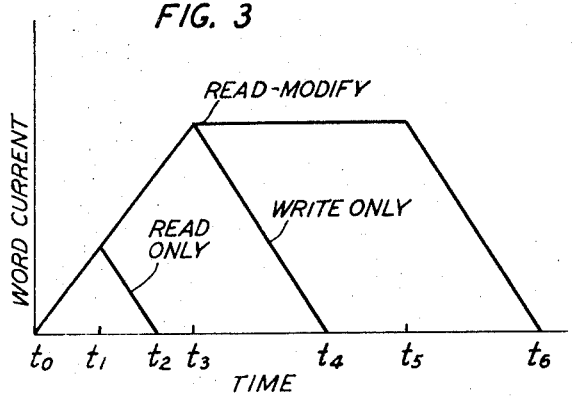
INVENTORS J. D. HEIGHTLEY
C. B. ROUNDY
S. G. WAABEN
BY
ATTORNEY ited States Patent Office
3,550,098
Patented Dec. 22, 1970

3,550,098
INTERLACED CURRENT PULSE CONFIGURATION CONTROL
John D. Heightley, Basking Ridge, Carlos B. Roundy, Neptune, and Sigurd G. Waaben, Princeton, N.J., assignors to Bell Telephone Laboratories, Incorporated, Murray Hill, N.J., a corporation of New York
Filed Nov. 1, 1967, Ser. No. 679,859
Int. Cl. G11c 7/00; H03k 3/57
U.S. Cl. 340—174                           19 Claims

ABSTRACT OF THE DISCLOSURE

A selection circuit in a current pulse driver imposes selectable amounts of electrical charge on a charge storage diode, and subsequently the application of a load across the diode depletes the charge. The circuit path to the load for depleting the charge is of a much lower impedance than the load so that the current pulse supplied to the load has an amplitude that is primarily a function of the charge magnitude. A magnetic memory receives pulses from the driver, and a central control selects the diode charge to produce a drive pulse appropriate to a desired memory operation.

BACKGROUND OF THE INVENTION

Field of the invention

This invention relates to the control of current pulse configuration. It relates in particular to arrangements for rapidly changing with a high degree of precision the configurations of adjacent pulses in a pulse train.

Description of the prior art

It is known that charge storage diodes are useful in fixing the configuration of pulses, but they have usually been heretofore employed to produce only a single pulse shape in any given system. A charge storage diode is so employed in the copending application of T. R. Finch and S. G. Waaben, Ser. No. 591,237, filed Nov. 1, 1966, now Pat. 3,484,765. However, there was heretofore no convenient arrangement for switching the configurations of pulses in a pulse train having a high average pulse repetition rate. For example, it was not convenient to produce in rapid succession pulses with accurately controlled amplitudes and having rise times in the range of tens of nanoseconds. Some typical difficulties in efforts in that direction were transistor breakdown, transistor heating, and circuit element capacitance, all of which were encountered when trying to control the configuration of a current surge at high speeds.

Certain magnetic memory systems, e.g., those electrically writeable memories with nondestructive readout capability, use read and write drive pulses of different sizes, but not all such systems are capable of high speed operation. Some magnetic memory systems provide drive pulses of the desired variable configurations with adequate speed because the memory storage elements are characterized by such long operating times that drive circuits can conveniently change drive pulse configurations to meet the memory system needs. However, newer memory technologies, e.g., the magnetically coated wire memory of the mentioned Finch et al. application, have higher speed capabilities; and the prior art techniques are no longer adequate for conveniently altering drive pulse configurations fast enough to realize the full benefits of those speed capabilities.

An important consideration in determining the adequacy of a pulse configuration switching technique is the accuracy with which pulse amplitude and the rise time slope can be controlled. For example, a magnetic thin film memory system as taught in the aforementioned Finch et al. application and in an article entitled "High Speed Plated Wire Memory System" by Sigurd G. Waaben, which appeared in IEEE Transactions on Electronic Computers, vol. EC–16, No. 3, June 1967, pp. 335–343, is capable of operating in a non-destructive readout mode wherein it is desirable to have a firm control on read drive pulse amplitude to avoid the destruction of information being read. It is also desirable in such a memory to maintain a uniform drive pulse rise time slope to facilitate the accurate detection of information derived from the memory.

Circuits are known in the art for using one circuit to change a capacitive element to one polarity and later using a different circuit for rapidly discharging that element. However, capacitors normally employed in such circuits are characterized in that the potential difference across the capacitor changes as a function of the remaining charge. Consequently such capacitors cannot be easily used in series in a constant voltage source.

It is, therefore, one object of the present invention to improve techniques for the random selection of individual pulse configurations in a pulse train.

Another object is to generate a train of randomly selectable pulse configurations with a high average pulse repetition rate.

A further object is to increase the output of magnetic memory systems by conditioning the drive circuit therefor at high speed, and prior to the execution of a request for service, so that it can respond in an optimum manner to a request for service.

SUMMARY OF THE INVENTION

The aforementioned and other objects of the invention are realized in one illustrative embodiment by selectively controlling the amount of charge imposed on a charge storage diode in a drive circuit supplying pulses. The diode is arranged in a discharge circuit of much lower impedance than the impedance of a load which is to be driven on discharge of the diode.

It is one feature of the invention that output pulses from the drive circuit have a substantially uniform rise time slope, and the peak amplitude of each pulse is a predictable function of the amount of charge imposed on the charge storage diode.

It is another feature that when the invention is used in a magnetic store system the selection of the amount of diode charge is effected by a central control for the store system so that the charge corresponds to the needs for the reading, writing, or modifying modes of store operation.

A further feature is that a hold circuit is connected to the diode and further actuatable for holding an attained drive circuit output pulse amplitude for a predetermined time after the discharge of the charge storage diode.

Yet another feature is that the drive circuit output pulse rise time slope and dwell time duration are electrically controllable.

A still further feature is that the use of a charge storage diode drive circuit with selectable charges in conjunction with a magnetic thin film memory makes possible the operation of the memory more closely in accord with the operating speed capabilities of magnetic thin film memory elements.

BRIEF DESCRIPTION OF THE DRAWING

The aforementioned objects of the invention, as well as additional features and advantages thereof, may be more clearly understood from a consideration of the following detailed description in connection with the appended claims and the attached drawings in which:

FIG. 1 is a simplified block and line diagram of a memory system utilizing the present invention;

FIG. 1A is a modification of the system of FIG. 1;

FIG. 2 is a simplified diagram of one form of memory element which is useful in the system of FIG. 1;

FIG. 3 is an idealized current wave diagram illustrating one aspect of the present invention;

DETAILED DESCRIPTION

Figure 4:
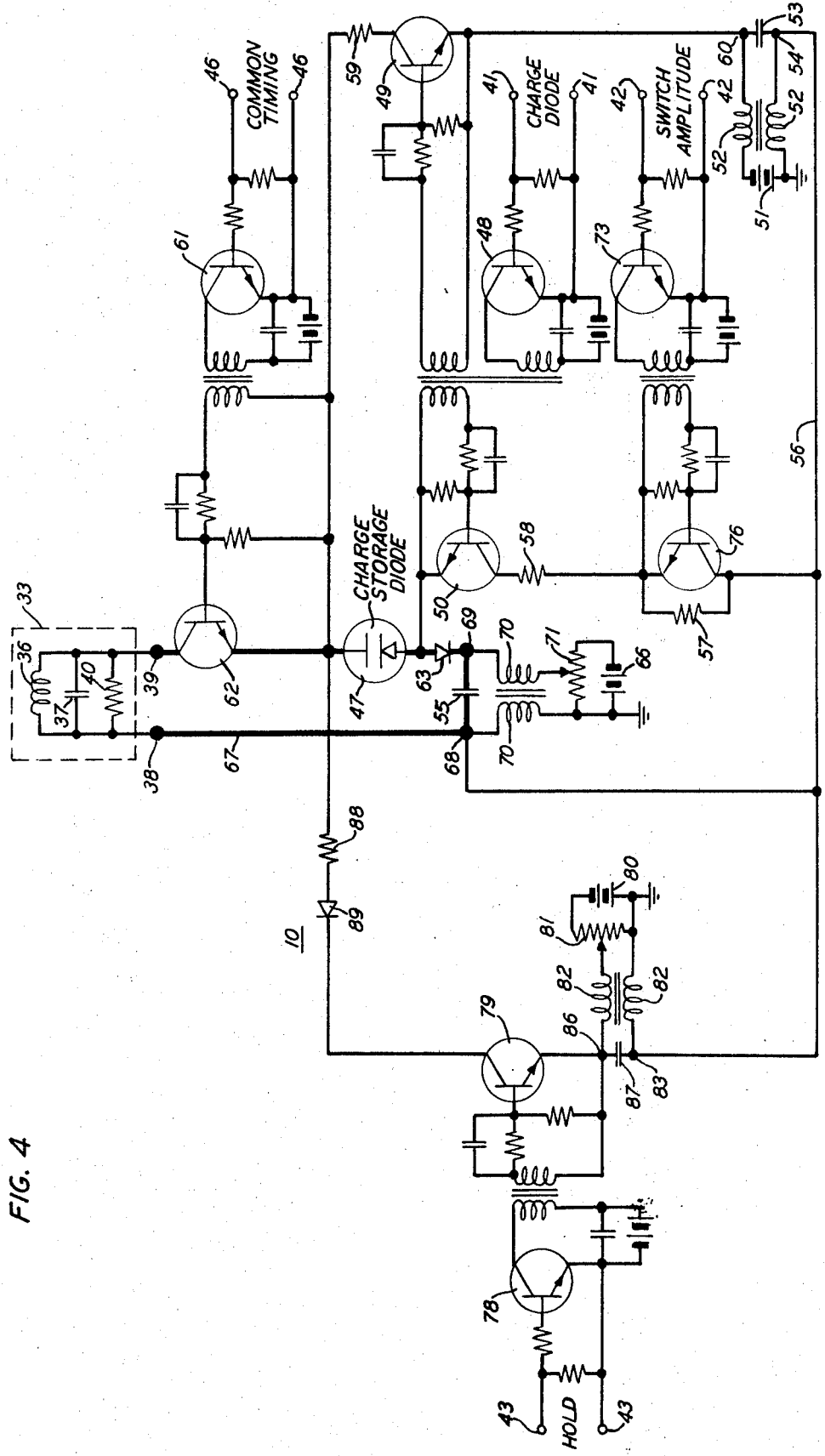
FIG. 4 is a schematic diagram of a word current control circuit employed in the system of FIG. 1.

In the memory system of FIG. 1 a word current control circuit 10 is associated with a magnetic memory 11 which is advantageously a memory utilizing drive signals of different amplitudes to exploit a nondestructive readout capability. An example of such a memory is the magnetic thin film memory of the aforementioned Finch et al. application and the aforementioned Waaben article. Such a memory includes, as shown in FIG. 2, a word drive circuit 12 for applying drive current pulses to a word solenoid 13 which links an electrical conductor 16 having magnetic material 17 coated therearound. Digit drive and sensing circuits 18 are coupled to the conductor 16 for cooperation with the word drive circuit 12 to store information in the portion of the magnetic material 17 lying under the word solenoid 13 and for reading out such information. The magnetic material is advantageously an anisotropic magnetic thin film material displaying substantially rectangular hysteresis characteristics in an easy direction of magnetization extending circumferentially around the wire 16. Details of the operation of a memory of this type are found in the aforementioned references and are now well known in the art.

In FIG. 1 a central control 19 supplies a command signal to a memory system timing control circuit 20 which utilizes that signal for providing various timing signals to the different components of the memory system as is known in the art. One of those timing signals, however, is a timing signal which is applied to the word current control circuit 10 to be hereinafter described in detail. Such timing signal may comprise a train of pulses such as the common timing pulses depicted in FIG. 5. Central control 19 also supplies data to the memory on a data bus 21 through a data register 22. The output of that register is coupled through digit logic circuits 23 for selecting a source for writing information into memory 11. Digit write drivers 26 respond to the output of the digit logic 23 for supplying digit write-in pulses to appropriate memory circuits as directed by the data supplied from the central control 19.

An address bus 27 supplies memory address signals from central control 19 through an address register 28, an address translator 29, and memory access circuits 30 to the memory 11. In a thin film memory of the coated wire type depicted in the aforementioned references, information is written into the memory by applying pulses to selected digit lines from the digit write drivers 26 at a time which overlaps the trailing edge of word write drive pulses to a word solenoid of the memory as supplied through the memory access circuits 30. The digit pulses thus tip the magnetic film magnetization to a circumferential polarity corresponding to the polarity of the digit drive pulse at the time that the word, or hard direction, magnetization is being removed from the film. Readout from the memory is obtained by similarly applying a drive pulse to a word solenoid indicated by the address provided from central control 19, to thereby rotate the magnetization in the affected part of the magnetic material on each digit circuit toward its hard direction for inducing a signal of corresponding polarity in the associated digit wire. The magnitude of the read drive signal thus applied determines whether the readout is destructive or nondestructive. Signals induced in the wire 16 during a readout operation are coupled by the wire to digit detectors 31, and the outputs from those detectors are looped around to be rewritten into the memory 11 or to be utilized as data output by the central control 19, or by other appropriate circuits.

Central control 19 supplies mode control signals on a bus 32 for directing the word current control circuit 10 to produce through memory access circuits 30 word drive pulses of a configuration which is appropriate to the mode of memory operation required by the central control 19. As in the case of the aforementioned timing signals, mode control signals also go to other parts of the memory system but such other connections are not shown since they are not necessary to an understanding of the present invention.

FIG. 3 shows a composite diagram of different idealized word current pulse configurations superimposed upon one another for different operating modes of the memory 11. The pulse configurations in FIG. 3 are those which would actually be applied, as determined by word current control circuit 10, to word solenoids, e.g., solenoid 13, in the memory 11. As superimposed in FIG. 3, the pulses have a common starting time $t_0$ and have different durations for the different modes of operation. However, their rise time slope similarity is evident in FIG. 3.

The read-only operation is the one most frequently used in data processing systems. In a plated wire memory having nondestructive readout capability, the read-only drive pulse has a lower magnitude than do other drive pulses to avoid the destruction of information stored in the memory. Consequently, the read-only pulse has shorter rise and fall times than do other memory pulses and it requires the shortest elapsed time for completion. Thus, the read-only pulse which begins at the time $t_0$ in FIG. 3 reaches its peak amplitude at time $t_1$, as determined in a manner which will be discussed in connection with FIG. 4. The read-only pulse terminates at time $t_2$. Such readout from the memory is employed, for example, to read stored program instructions or to read data to be used in executing program instructions.

The write-only pulse in FIG. 3 is initiated at time, $t_0$, peaks at time $t_3$, and is terminated at time $t_4$. The write-only operation is less frequently employed than are the read-only operations so that its longer duration does not constitute an excessive time burden. For example, it is used repetitively for storing blocks of program and data words prior to the execution of a program. The larger amplitude of the write-only pulse drives the word solenoid harder and correspondingly produces a larger rotation of the magnetization in the affected parts of the magnetic film 17. A digit circuit pulse applied during the trailing edge portion of the write-only pulse on the word circuit tips magnetization to a desired direction in the affected storage element. Obviously the write-only pulse causes a destructive readout that is available if needed.

The read-modify pulse begins at time $t_0$ and peaks at time $t_3$, as in the case of the write-only pulse. However, the read-modify pulse has a plateau at approximately its peak amplitude, and that plateau extends to a time $t_5$ at which the trailing edge of the pulse commences. The pulse terminates at time $t_6$. In the read-modify mode of operation a word can be destructively read out of the memory, have a flag bit therein tested, and have the same word or a different word read back into the memory during the trailing portion of the pulse. The extent of the plateau in the read-modify pulse is fixed by program and is a function of the time required to perform external operations between the memory read and write operations involved. The read-modify mode is also useful to exchange information between a random access memory 11 and a bulk store, such as disk storage, not shown, often found in data processing systems. For such information exchange a particular word location is accessed by an address provided by central control 19. The information at that word location is destructively read from the memory 11 and written into the aforementioned disk storage via a writing head at the disk store. As soon as the transfer to the disk storage is complete, the readout head from that store supplies a new set of information to the digit circuits of memory 11 for writing the latter information into the memory during the terminal part of the same read-modify pulse.

Word current control circuits 10 permit the interlacing of the different pulses of the type shown in FIG. 3 as will be subsequently described. The interlace is accomplished in any random manner directed by central control 19 and at a high speed which is compatible with the operating characteristics of magnetic thin film memory elements. However, in the process of such high speed interlaced operation, the amplitudes and rise time slopes of the pulses are simply but rigidly controlled.

The word current control circuit 10 is shown in detail in FIG. 4. A load circuit 33 includes a coil 36 and a capacitor 37 connected across output terminals 38 and 39 of the control circuit 10. Coil 36 and capacitor 37 are connected in parallel to represent the equivalent circuit impedance of memory access circuit 30 and memory 11 as seen at the output terminals of the control circuit 10. A resistor 40 is also connected across the terminals 38 and 39 to provide a leakage circuit path to discharge leakage capacitances represented by capacitor 37.

The mode bus 32 in FIG. 1 includes 2-wire circuits for supplying "charge-diode" signals to input terminals 41, "switch-amplitude" signals to input terminals 42, and "hold" signals to input terminals 43 of word current control circuit 10. Common-timing signals in FIG. 4 appear at input terminals 46 and are supplied by the timing circuit from timing control 20 of FIG. 1. Every operation of the word current control circuit causes any corresponding output pulse to be preceded by a time interval during which a charge is imposed upon a charge storage diode 47, which is schematically represented by a diode with a capacitor at its cathode electrode. A charge storage diode stores minority carriers, in a manner which is well known in the art, when such diode is conducting electric current in the forward direction. Such stored minority carriers can be subsequently swept out of the diode by the application of a reverse current and during such a sweeping operation the diode presents an extremely low impedance to the reverse current.

Many semiconductor diodes which have been known for a number of years in the art are capable of operating, at least to some extent, as charge storage diodes. However, there are presently available charge storage diodes which are designed specifically to exploit the charge storage effect. The principal advantages of a charge storage diode are the low impedance which it presents during its reverse conduction interval, the limitation imposed on reverse current amplitude by the magnitude of charge stored in the diode, and the sharp termination which is imposed upon the reverse current when the charge has been depleted. This sharp termination is to be compared favorably with the asymptotic type of discharge termination which characterizes ordinary capacitors.

All transistors shown in FIG. 4, and to be cited in the discussion of the circuit there shown, are operated in saturated conduction as switches. Thus, they are normally nonconducting, but upon the application of an appropriate base-emitter electrode bias they are driven into conduction in the so-called saturated, or nonlinear, state at whatever conduction level is dictated by circuits connected between collector and emitter electrodes of a particular transistor. This type of transistor operation and circuit is well known in the art and consequently details of associated circuit elements for producing such results, e.g., details of bias, damping, speed-up coupling, and the like, are not discussed here.

Figure 5:
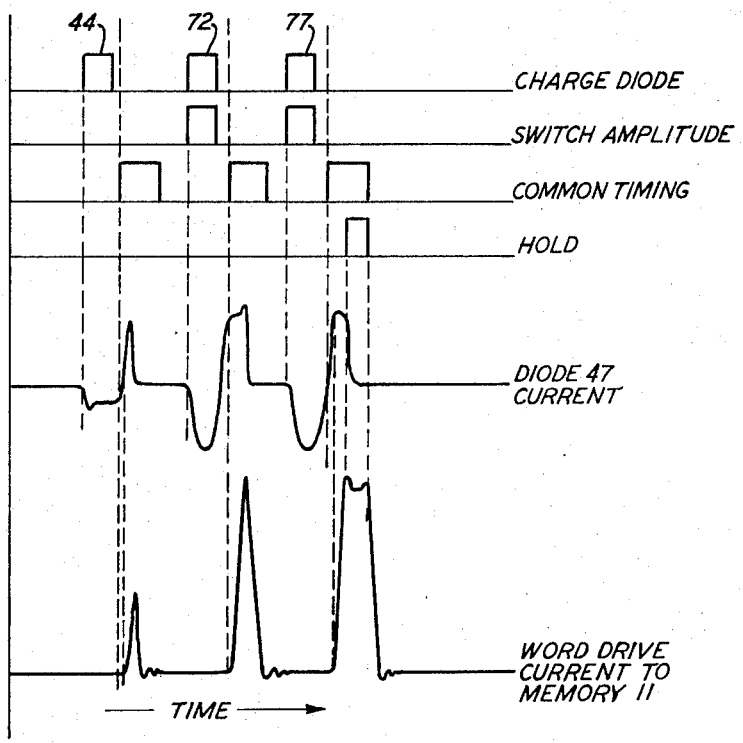
FIG. 5 is a family of wave diagrams "drawn" to a common time scale and illustrating the operation of the circuit of FIG. 4.

Charge-diode pulses shown in FIG. 5 are applied to input terminals 41 in FIG. 4 to drive a transistor 48 into conduction. The output of that transistor is transformer coupled to two further transistors 49 and 50 for similarly driving them into conduction. Conduction in the latter two transistors establishes a loop circuit including a poential source represented by a battery 51 with its positive terminal grounded, a longitudinal choke represented by a pair of coupled coils 52, and a capacitor 53 which provides an alternating current by-pass in the loop and around the battery 51. The aforementioned loop current path extends from a terminal 54 of the source circuit through a common circuit 56, a resistor 57, a resistor 58, transistor 50, charge storage diode 47 in its forward direction, a resistor 59, and transistor 49, back to another terminal 60 of the course circuit.

The output terminal voltage of battery 51 and the resistance magnitude of resistors 57 and 58 fix the level of current which is driven through diode 47 during the charge-diode pulse at input terminals 41. Resistor 59 is small compared to resistors 57 and 58 and performs a current limiting function in the event of the failure of other circuit elements. The current pulse applied to the diode 47 in its forward direction of conduction imposes a charge upon the diode which is determined by the magnitude and duration of forward current and is adequate to produce a subsequent output pulse therefrom of a predetermined maximum magnitude. Thus, the charge imposed is in a sense both time and amplitude limited as determined by the duration and amplitude of the charge-diode pulse. The exact configuration of that pulse is not critical as long as the integral of the current pulse with respect to time is well defined. Such integral is relatively easily defined by circuit elements known in the art without encountering the previously mentioned problems of transistor breakdown, transistor heating, and circuit element capacitance. Those problems are absent as long as sufficient time is available to deliver the necessary charge at a lower current over a somewhat longer time interval than is required for later depleting the charge at a higher current level.

After the end of a charge-diode pulse, the charge upon the diode 47 would normally begin to decay as a result of normal carrier recombination associated with the semiconductor diode 47. However, in the high speed operations contemplated by the present invention, the charged diode is not left unused for long intervals before it is intentionally discharged. In fact, it can be seen in FIG. 5 that the common timing pulses applied to input terminals 46 follow almost immediately upon the termination of the charge-diode pulses.

Each common timing pulse actuates a transistor 61 and the output of that transistor is transformer-coupled to apply turn-on bias to a further transistor 62 for closing a discharge path through the charge storage diode 47. When transistor 62 begins to conduct, discharge current is drawn from diode 47 through a low impedance path between output terminals 38 and 39. This low impedance discharge path extends from the emitter-electrode of transistor 62, through charge storage diode 47 in the reverse direction, a diode 63, a potential source represented by a by-passed battery 66, a lead 67, and load 33 to the collector electrode of transistor 62. Thus, the discharge path is essentially nonresistive. Diode 63 prevents charge current flowing from battery 51 during a charge-diode pulse from flowing through circuit 56 and source terminals 68 and 69 to the diode 47, thereby by-passing resistors 57 and 58 and transistor 50. It might appear at first glance that the common circuit 56 could be broken between terminal 68 and the resistor 57 to avoid the necessity for adding diode 63, but if that were done it would permit the diode charging circuits previously described to float with respect to the rest of the control circuit 10 and thereby raise the possibility that some external noise signal, to which choke coils 52 are a high impedance, could be induced and produce a false charge on the diode 47.

Battery 66 has its positive terminal grounded and is connected to terminals 68 and 69, and across a bypass capacitor 55, through another longitudinal choke including coils 70. In addition, the output voltage from the battery 66 to the terminals 68 and 69 is adjustable as schematically represented by the potentiometer 71 connected across the battery terminals. Adjustment of potentiometer 71 affects the rise time slope of the pulses of word drive current to memory.

The aforementioned discharge path for diode 47 is shown by broad lines in FIG. 4 and has a much lower impedance to the discharge current than does the load 33. Care must be exercised to make the described discharge path as small as possible without introducing significant stray capacity between the two sides of the loop formed by the path. This technique keeps drive impedance much lower than load impedance. The significance of this impedance relation will be subsequently discussed. When the charge on diode 47 has been depleted, conduction therethrough ceases rapidly as can be seen from the wave diagrams of charge storage diode current in FIG. 5. The time at which discharge ends marks the peak of the word drive current supplied to memory 11, as also seen in FIG. 5. A longer time is required for the word drive current to fall to zero, however, because it is necessary for accumulated charge in leakage capacitances of the load 33 to be dissipated through the resistor 40. The resistance of that resistor is selected to provide a desired word current fall time and that fall time is advantageously selected to be approximately the same as the rise time as shown in FIG. 3 and in FIG. 5.

The common timing pulses are terminated at any convenient time after the end of the drive pulse to the load 33, and they must certainly not be ended until after the termination of conduction in diode 47. The reason for this requirement is that the diode is readily capable of absorbing the inductive kick from the load 33 upon termination of drive current thereto because of the inherent characteristics of the charge storage diode. Such characteristics include, as compared to transistors, higher resistance to voltage breakdown, lower capacitance, and generates less heat on current interruption. However, it has been found that when the single transistor 62 is used to terminate the drive current to the load, it is much less able to accommodate the voltage strain imposed and often fails.

It has been noted that the discharge path for diode 47 has a low impedance with respect to the load 33 in embodiments in which the word current control circuit 10 is employed in conjunction with a thin film memory such as represented by the plated wire memory element in FIG. 2.

The circuit of FIG. 4 is normally operated at high frequencies at which it might appear that the equivalent capacitor 37 has very low impedance. However, capacitor 37 represents stray impedances and has a small capacitance that is rapidly charged at the outset of each drive pulse from terminals 38 and 39. Thereafter during such pulse capacitor 37 is largely ineffective and does not pull down the impedance of load 33. The load displays a relatively constant impedance which includes a relatively constant inductive reactance. The latter reactance is comparatively constant in plated wire memories in which the inductance of the word solenoid is large compared to possible variations in the inductive loading as a result of variations in the binary information conditions stored in the magnetic elements. It will be subsequently seen that the employment of a load with a constant inductance is advantageously employed for applying drive pulses of different selectable configurations to the memory.

Another advantageous factor is the fact that, insofar as the output terminals 38 and 39 are concerned, the word current control source 10 acts as a constant voltage source. Thus, the potentiometer 71, which fixes the output derived from battery 66, is normally not adjusted during circuit operation, and the output voltage presented at terminals 68 and 69 is constant. Different amounts of charge are imposed upon diode 47 in a manner which will be described, but these simply alter the charge in the diode without significantly altering the terminal voltage across the diode. It is a characteristic of such diodes that as long as there is charge stored therein the potential difference across the diode terminals is substantially constant regardless of the amount of such charge that is present. Since the output voltage from write control source 10 is substantially constant, and since the load imposed on the circuit 10 has a substantially constant inductance, the rise time slope for all output pulses applied from the circuit 10 to the load 33 is likewise substantially constant. This constant rise time slope can be seen in the diagram of FIG. 3 and in the drive-current-to-memory diagram of FIG. 5.

There is a further secondary effect which is beneficial and which flows from the constant rise time slope of output pulses from the word current control circuit 10. The constant slope means that the peak amplitude of output pulses at terminals 38 and 39 can be readily predicted so that output pulses for nondestructive readout operation can be assigned a maximum possible amplitude with a minimum safety margin requirement for avoiding destruction of information being read. It is true that changing the amount of charge imposed upon the diode 47 also influences the peak amplitude of output current pulses from the circuit 10. However, this influence is of a relatively coarse nature. Adjustment of the potentiometer 71 changes the output voltage of the word current control circuit 10 and thus changes the output current rise time slope to exercise a fine control on the peak output current amplitude for any given magnitude of charge on the diode 47.

If a write-only operation is to be performed, central control 19 causes the mode bus 32 of FIG. 1 to supply to the write current control circuit 10 a switch-amplitude pulse in coincidence with a charge-diode pulse 72. This switch-amplitude pulse is applied at the terminals 42 in FIG. 4 and drives transistors 73 and 76 into conduction so that the latter transistor provides a low impedance shunt current path around the resistor 57. This reduction of resistance in the charging loop path for the diode 47 means that during the write-only operation a higher current is applied to the diode than was applied during the read-only operation; and, consequently, a higher level of charge is imposed upon the diode. This difference can be seen in FIG. 5 by comparing the relative magnitudes of the negative-going lobes of the charge storage diode current during times coincident with the charge-diode pulses 44 and 72, respectively. It follows then that during the common timing pulse which follows the charge-diode pulse 72, a larger output current amplitude is supplied to the load 33. This again is evident from the FIGS. 3 and 5. Thus, it can be seen that the amplitude of current supplied to the load is limited by the level of charge stored in diode 47. This amplitude limiting capability results from the essentially non-resistive current paths and the voltage and impedance relationships described for the diode discharge current path.

During a read-modify operation the memory is destructively read out and some information is thereafter written into the same address as previously outlined. The destructive readout occurs during the rise time $t_0$–$t_3$ of the read-modify pulse which is initiated by a common timing pulse following a charge-diode pulse 77. The peak amplitude of the read-modify pulse is attained at the time of substantially complete discharge of the diode 47. However, substantially that same amplitude is maintained by the application of a holding current in the word current control circuit 10. When the central control 19 requires a read-modify operation it supplies a hold pulse over the mode bus 32 to the input terminals 43 of the word current control circuit 10. In view of the previously outlined predictability of pulse rise time slope and peak amplitude, the occurrence time of that peak amplitude is also readily predictable and appropriate logic circuits, not shown, are incorporated in the central control 19 to initiate the hold pulse soon after the attainment of the peak in the write-modify pulse. This relationship can be seen in FIG. 5 where the leading edge of the hold current pulse occurs just after the peak of the charge storage diode current and just after the attainment of peak amplitude of the drive current to memory corresponding to the same common timing pulse.

The hold pulse at terminals 43 in FIG. 4 causes transistors 78 and 79 to be driven into conduction. An operating potential source is connected in series with the collector-emitter circuit of transistor 79 and includes a battery 80 with its positive terminal grounded and having a potentiometer 81 connected across its output terminals for adjusting the amount of output voltage to be derived from the battery and thereby adjusting hold current level. The potentiometer is coupled through a longitudinal choke including coils 82 to the terminals 83 and 86 and a by-pass capacitor 87. Conduction in transistor 79 completes a hold current path which extends from output terminal 39 through transistor 62, a resistor 88, a diode 89, the transistor 79, capacitor 87, and lead 67, to the output terminal 38. Resistor 88 and potentiometer 81 determine the magnitude of the hold current which is thus supplied by word current control circuit 10 to the load 33. This hold current level is substantially the same as the peak current supplied by diode 47.

Diode 89 provides back-up current steering protection in the described hold current path to prevent accidental conduction therein during a charge-diode pulse when the diode 47 is charging. Such accidental breakdown might otherwise occur, for example, through a path from the conductor 56 through the capacitor 87, the external base-emitter circuit of transistor 79, and the forward direction of the base-collector junction of the transistor. Conduction in this path could divert current from the diode 47, at the very least; and if the circuit resistances are sufficiently different, it could render the charging path through transistor 50 a virtual nullity insofar as diode 47 is concerned.

It will be observed that the circuit of FIG. 4 includes three separate loop circuits all having a common connection which includes circuit 56, lead 67, and terminals 68 and 83. One loop supplies charging current to diode 47, a second conducts discharge current through diode 47 to load 33, and a third conducts holding current to load 33 after diode 47 has ceased reverse conduction.

The hold current pulse is terminated after a predetermined time which is dependent upon the time required for any operation to be performed by the illustrated store system in the interval between read and write in the memory. Such termination is brought about by terminating the hold current pulse and the common timing pulse simultaneously. Since two transistors are employed to break the hold current path the fall time characteristics are similar to those obtained in other operations by the charge storage diode 47 alone without seriously endangering those transistors.

It is apparent in FIG. 5 that the drive pulses to memory 11 are spaced by substantial intervals which permit the charge storage diode 47 to be charged before a new operation is undertaken. However, that operation represents a rather high pulse repetition rate. By having a nondestructive readout capability, because different drive amplitudes are available, the embodiment of FIG. 4 exploits the fact of life that in data processing systems store readout is generally needed in about 80 percent of the operations. If electrically writeable memory is employed, destructive readout and regeneration must be used when operating at such high speeds that it is not convenient to change drive pulse amplitude. The embodiment of FIG. 4 operates easily on a read-only cycle time of about 100 nano seconds and a read-regenerate cycle time of about 240 nanoseconds. Ten of those read-regenerate cycles would require 2400 nanoseconds. However, when that embodiment uses its read-only lower amplitude drive for 80 percent of those ten cycles, a total time for the ten cycles drops to 1280 nanoseconds for a saving of almost 50 percent in an average operating time. This saving is realized by asynchronously interlacing the various commands from central control 19 in the operation of word current control circuit 10.

FIG. 5 shows, as previously remarked, that charging current for diode 47 has different amplitudes (negative lobes in diode 47 current before each pulse of word drive current to memory 11). The duration of each charging interval is the same as fixed by the train of charge-diode pulses. It is important in some systems to reduce the likelihood of a circuit failure permitting write amplitude drive current to be produced during a read-only interval and thereby destroy stored information. Such a failure might occur if transistor 76 should develop a short circuit between collector and emitter electrodes. The possibility can be reduced and the desirable results achieved by eliminating transistor 76 and resistor 57 and connecting circuit 56 directly to resistor 58. Charge diode pulses are then adjusted to appropriate durations for a given fixed amplitude to place the desired charge on diode 47. Common control 19 provides the necessary control in the form of ordinary read and write commands normally produced thereby. These commands are applied to mode bus 32 of FIG. 1. Between the two cross marks on that bus are substituted two monostable multivibrators 96 and 97 as shown in FIG. 1A, and having different operating times in response to triggering signals. The outputs of both multivibrators are applied to terminals 41 on FIG. 4 for driving those terminals on an EXCLUSIVE-OR basis. During read-only operations central control 19 triggers multivibrator 96, and it in turn drives word current control circuit 10 for the correct time to place the desired charge on diode 47. Similarly during writing operations central control 19 triggers multivibrator 97 for driving circuit 10 a longer time to place a larger charge on diode 47.

Figure 6:
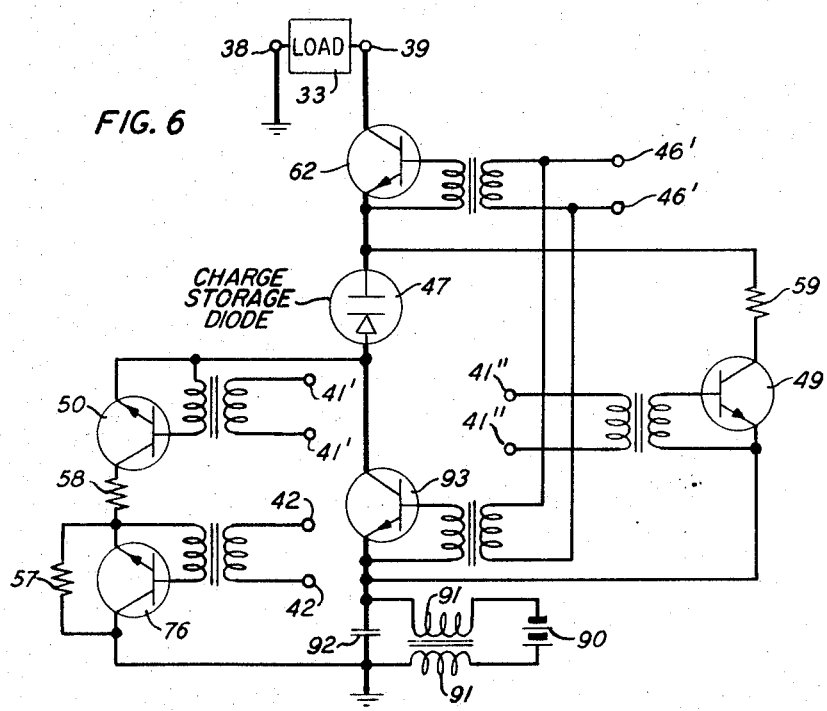
FIG. 6 is a schematic diagram of a modified word current control circuit.

FIG. 6 shows a modified form of the word current control 10 which is advantageously employed when the peak current magnitudes and rise and fall times of all operating pulses for a system have been determined. Since it is then not necessary to adjust reference voltage, rise time slope, or hold level, the functions of the batteries 51, 66, and 80 in FIG. 4 can be combined. Such a combination has been effected in FIG. 6 and is represented by a battery 90 which is coupled through a longitudinal choke including coils 91 to the terminals of a capacitor 92 which is included in the low impedance discharge path of the charge storage diode 47. In this embodiment charge-diode pulses are applied at input terminals 41' and 41" for controlling transistors 49 and 50 as previously discussed in connection with FIG. 4. Similarly, and assuming amplitude control of charge-diode pulses, switch-amplitude pulses are applied at input terminals 42 for actuating transistor 76 to control the level of resistance in the charging path for the diode 47. That charging path is the same as it was in FIG. 4 except that a different battery 90 provides charging potential in the charging path for the diode 47. The same battery 90 also determines the rise time slope of output current pulses supplied at terminals 38 and 39.

Common timing pulses are applied at terminals 46' for controlling the transistor 62 in much the same fashion previously described in connection with FIG. 4. However, in FIG. 6, the same common timing pulses necessarily control a further transistor 93 in step with the transistor 62 in the discharge path for diode 47. Transistor 93 serves much the same function as did the diode 63 in FIG. 4 to prevent undesirable shunting of the charging path for diode 47. In the embodiment of FIG. 6 the circuit of transistor 49 doubles as the holding current circuit during read-modify operations. For the latter operations central control 19 applies the hold pulse to terminals 41" for reactivating transistor 49. Thus resistor 59 fixes hold current level in FIG. 6. Apart from the enumerated differences, the embodiment of FIG. 6 operates in essentially the same fashion as did the embodiment of FIG. 4.

Although the present invention has been described in connection with particular embodiments thereof, it is to be understood that additional embodiments and modifications which will be obvious to those skilled in the art are included within the spirit and scope of the invention.

What is claimed is:

1. A circuit supplying drive pulses of different selectable configurations and including
   an asymmetrical conduction device and a control switch connected in a series connection between a pair of output terminals for load circuit connection for said circuit, said device storing current carriers therein in response to the conduction of current therethrough in a first direction, said series connection having such a low impedance that current amplitude in a second direction in such connection is limited by the level of charge stored in said device,
   means, exclusive of said load circuit, applying to said device in said first conduction direction charging pulses of different selectable integral of current with respect to time for storing carriers and thereby charging said device to correspondingly different charge levels, and
   means alternately operating said applying means to charge said device and operating said control switch to discharge said device for producing a drive pulse, said operating means including means selecting one of said integrals during device charging for thereby causing the resulting drive pulse to have a corresponding one of said configurations during device discharge.

2. The circuit in accordance with claim 1 in which said device is a charge storage diode, and said connection includes a voltage source comprising a capacitor and means maintaining a substantially constant voltage across said capacitor.

3. The circuit in accordance with claim 2 in which said applying means comprises a potential source having its output coupled in series with only said diode of said series connection.

4. The circuit in accordance with claim 1 in which said applying means comprises means selectively varying the durations of said charging pulses for fixing corresponding charge levels in said device.

5. The circuit in accordance with claim 1 in which said applying means comprises means selectively connecting different amounts of resistance in series therewith for fixing corresponding amplitudes of said charging pulses.

6. The circuit in accordance with claim 5 in which said applying means comprises
   a loop circuit including said device, a source of potential, and said connecting means,
   first and second transistors having emitter-collector current paths therein connected in said loop circuit on opposite sides of said device and poled for forward conduction in said first direction in said loop, and
   means simultaneously applying turn-on bias to said first and second transistors for initiating conduction therein from said source.

7. The circuit in accordance with claim 1 in which
   a further connection is provided between said applying means and said series connection at a point which is common to one of said terminals but electrically separates from said device, and
   said series connection comprises in addition
   a diode poled for forward conduction in a direction which is opposite to said first direction of said device, and
   a potential source connected in said series connection between said common point and said diode for setting rise time slope of said drive pulses.

8. The circuit in accordance with claim 1 in which
   an inductive load is connected between said output terminals, and
   the impedance of said load at said terminals is much higher than the impedance of said series connection at said terminals so that the voltage between such terminals during a drive pulse is essentially independent of impedance variations in said load.

9. The circuit in accordance with claim 8 in which said load includes
   a plurality of anisotropic thin film magnetic memory elements having a predetermined easy axis magnetization direction for storing different information bit types, and
   circuit means coupled between said terminals and extending substantially parallel to said easy direction in magnetization-influencing relation to said elements to present to said circuit substantially constant inductance regardless of the information bit types stored at any time.

10. The circuit in accordance with claim 8 in which said load includes
    a magnetic memory connected to receive said drive pulses and having plural selectable modes of operation corresponding to said configurations, respectively, and each mode having a different duration, and
    said applying means includes means asynchronously interlacing said modes with one another in random sequences.

11. The circuit in accordance with claim 10 in which said modes include a write-in mode and a nondestructive readout mode, and
    said applying means limit said charging pulse current integrals to a lower level for said nondestructive readout mode than for said write-in mode.

12. The circuit in accordance with claim 1 in which said operating means includes means operable in conjunction with a predetermined one of said charging pulse integrals to maintain a predetermined drive pulse amplitude for a predetermined time interval.

13. The circuit in accordance with claim 12 in which said charging pulse maintaining means comprises resistance means selectively connectable across said control switch and said output terminals following the rise time of one of said drive pulses, said resistance means having a resistance of a magnitude to maintain said predetermined drive pulse amplitude after the discharge of said charge storage diode.

14. The circuit in accordance with claim 13 in which a diode is connected in series with said resistance means and poled to prevent conduction of said charging pulses to said control switch through said resistance means.

15. The circuit in accordance with claim 12 in which
    said applying means comprises first and second transistors having emitter-collector current paths therein connected in a loop circuit with said device for conducting said charging pulses to said device, and
    said maintaining means comprises means including said first transistor maintaining said predetermined amplitude.

16. The circuit in accordance with claim 1 in which
    a load having an equivalent capacitive impedance is connected between said output terminals,
    resistance means are connected between said output terminals and present a resistance thereto of a magnitude which is proportioned with respect to said equivalent capacitive impedance at said terminals to fix drive pulse fall time at the end of each of said drive pulses.

17. The circuit in accordance with claim 1 in which said applying means comprise a first loop circuit,
a load is connected across said output terminals to form with said diode and control switch a second loop circuit,
means operable in conjunction with a predetermined one of said charging pulse integrals maintaining a predetermined drive pulse amplitude, said maintaining means forming with said load and said control switch a third loop circuit, and
said first, second, and third loop circuits having a common circuit connection.

18. The circuit in accordance with claim 17 in which each of said loop circuits includes a different source of potential for separately establishing charging pulse amplitude, drive pulse rise time, and drive pulse hold time.

19. The circuit in accordance with claim 1 in which said applying means comprise a first loop circuit,
a load is connected across said output terminals to form with said diode and control switch a second loop circuit, and
a single source of current is connected in series in both of said loop circuits.

References Cited
UNITED STATES PATENTS 3,056,115  9/1962  Lo _____ 340—174

STANLEY M. URYNOWICZ, JR., Primary Examiner

U.S. Cl. X.R.

307—246, 281, 270